United States Patent
Bäuml et al.

(10) Patent No.: US 12,331,475 B2
(45) Date of Patent: Jun. 17, 2025

(54) SOIL PROCESSING ROLLER

(71) Applicant: Hamm AG, Tirschenreuth (DE)

(72) Inventors: Stefan Bäuml, Tirschenreuth (DE); Günter Rath, Krummennaab (DE)

(73) Assignee: HAMM AG, Tirschenreuth (DE)

( * ) Notice: Subject to any disclaimer, the term of this patent is extended or adjusted under 35 U.S.C. 154(b) by 219 days.

(21) Appl. No.: 18/200,710

(22) Filed: May 23, 2023

(65) Prior Publication Data
US 2023/0383491 A1 Nov. 30, 2023

(30) Foreign Application Priority Data
May 25, 2022 (DE) ...................... 10 2022 113 204.8

(51) Int. Cl.
*E02D 3/026* (2006.01)
*E01C 19/26* (2006.01)

(52) U.S. Cl.
CPC .............. *E02D 3/026* (2013.01); *E01C 19/26* (2013.01)

(58) Field of Classification Search
CPC ......... E02D 3/026; E02D 3/074; E01C 19/26; E01C 19/41; E01C 19/38
See application file for complete search history.

(56) References Cited

U.S. PATENT DOCUMENTS

| | | | | |
|---|---|---|---|---|
| 6,007,273 A * | 12/1999 | Magee | ..................... | F16C 19/54 404/130 |
| 6,829,986 B2 * | 12/2004 | Richter | ................. | E01C 19/288 74/61 |
| 6,929,421 B2 * | 8/2005 | Potts | ..................... | E01C 19/286 74/61 |
| 10,265,730 B2 * | 4/2019 | Johnsson | ................ | B06B 1/162 |

(Continued)

FOREIGN PATENT DOCUMENTS

| CN | 214459392 | 10/2021 |
|---|---|---|
| DE | 4033793 | 4/1992 |

(Continued)

OTHER PUBLICATIONS

German Search Report filed in Appl No. 10 2022 113 204.8 dated Mar. 23, 2023.

(Continued)

*Primary Examiner* — Benjamin F Fiorello
(74) *Attorney, Agent, or Firm* — RANKIN, HILL & CLARK LLP

(57) ABSTRACT

A soil processing roller includes an elongated roller shell that rotates about a roller axis of rotation and a first fluid chamber in a roller interior space delimited by the roller shell. In association with the first fluid chamber a first opening group is provided which includes a first filling opening, a first discharge opening and a first fill level control opening. A shielding element is arranged in an axial end region of the roller interior space which does not rotate about (Continued)

the roller axis of rotation during a soil processing operation. A first release recess is provided in the shielding element, and a second fluid chamber substantially separated from the first fluid chamber against fluid exchange is delimited by the roller shell. In association with the second fluid chamber a second opening group is provided which includes a second filling opening, a second discharge opening and a second fill level control opening.

18 Claims, 3 Drawing Sheets

(56) References Cited

U.S. PATENT DOCUMENTS

| | | | | |
|---|---|---|---|---|
| 2003/0082003 A1* | 5/2003 | Potts | ....................... | E02D 3/074 404/117 |
| 2003/0223817 A1* | 12/2003 | Stelbrink | ............... | E01C 19/286 404/122 |
| 2014/0161529 A1* | 6/2014 | Darscheid | ............... | E01C 19/38 404/117 |
| 2016/0176278 A1* | 6/2016 | Bletscher | .............. | E01C 19/266 180/291 |
| 2021/0070168 A1* | 3/2021 | Kirita | ................... | B60K 15/077 |

FOREIGN PATENT DOCUMENTS

| | | |
|---|---|---|
| DE | 102012024104 | 6/2014 |
| JP | H06-299511 | 10/1994 |
| JP | 2018-150675 | 9/2018 |

OTHER PUBLICATIONS

European Search Report for EP23165006, dated Oct. 18, 2023, 10 pages.

* cited by examiner

SOIL PROCESSING ROLLER

The present invention relates to a soil processing roller, comprising a roller shell elongated in the direction of a roller axis of rotation and rotating about the roller axis of rotation in a soil processing operation. A first fluid chamber is provided in a roller interior space delimited by the roller shell, wherein a first opening group comprising a first filling opening, a first discharge opening and a first fill level control opening is provided in association with the first fluid chamber in an axial end region of the roller interior space.

A shielding element which does not rotate about the roller axis of rotation in a soil processing operation is arranged in the axial end region of the roller interior space, wherein a first release recess is provided in the shielding element.

Such a soil processing roller is known from JP-H 06299511 A. In a fluid chamber provided in the roller interior space and surrounded by a fluid chamber housing, two unbalanced masses which can be driven to rotate about respective unbalanced axes of rotation and a gear arrangement which transmits a torque from an unbalanced drive motor to the unbalanced masses are provided. To lubricate the bearings of the unbalanced masses and the gear arrangement, the fluid chamber is partially filled with a fluid, in particular oil. An opening group is associated with this fluid chamber in an axial end region of the roller interior space, the opening group comprising a filling opening for filling fluid into the fluid chamber, a discharge opening for discharging fluid from the fluid chamber and a fill level control opening for monitoring the fill level when filling fluid via the filling opening. The various openings of this opening group are arranged in a housing portion of the fluid chamber housing rotating about the roller axis of rotation in a soil processing operation.

In the axial end region of the roller interior space in which the opening group is provided, a shielding element is provided which does not rotate about the roller axis of rotation and is therefore basically stationary during a soil processing operation. The shielding element forms a plate-like roller support element via which the soil processing roller is supported in this axial end region of the roller interior space or of the soil processing roller with respect to a machine frame of a soil processing machine. In the plate-like roller support element or shielding element, a release recess is arranged which is closed off by a closure element during soil processing operation.

The various openings of the opening group have the same radial distance from the roller axis of rotation, but are arranged at different circumferential positions at a distance from one another. The radial distance of the openings of the opening group from the roller axis of rotation essentially corresponds to the radial distance of the release recess from the roller axis of rotation, so that by corresponding rotational positioning of the soil processing roller about the roller axis of rotation, each of the openings of the opening group can be positioned so that it is positioned in the circumferential direction essentially in the region of the release recess. Thus, with the end element removed from the release recess, it is possible to inspect each of the openings of the opening group by viewing substantially in the axial direction, to determine whether it is sealed against the escape of fluid or whether fluid leakage is occurring.

The object of the present invention is to provide a soil processing roller in which a high level of safety against incorrect operation is achieved with an improved lubricating effect.

According to the invention, this object is achieved by a soil processing roller comprising:
- a roller shell elongated in the direction of a roller axis of rotation and rotating about the roller axis of rotation in a soil processing operation,
- a first fluid chamber in a roller interior space delimited by the roller shell, wherein a first opening group having a first filling opening, a first discharge opening and a first fill level control opening is provided in association with the first fluid chamber in an axial end region of the roller interior space,
- a shielding element arranged in the axial end region of the roller interior space and not rotating about the roller axis of rotation in a soil processing operation, wherein a first release recess is provided in the shielding element.

The soil processing roller according to the invention is characterized by a second fluid chamber, substantially separated from the first fluid chamber against fluid exchange, arranged in the roller interior space delimited by the roller shell, wherein in association with the second fluid chamber in the axial end region of the roller interior space a second opening group with a second filling opening, a second discharge opening and a second fill level control opening is provided. In a first rotational positioning of the soil processing roller about the roller axis of rotation, the first discharge opening and the first level control opening are positioned in the circumferential direction in the region of the first release recess, and the second discharge opening and the second level control opening are covered by the shielding element. In a second rotational positioning of the soil processing roller about the roller axis of rotation, the second discharge opening and the second level control opening are positioned in the circumferential direction in the region of the first release recess and the first discharge opening and the first level control opening are covered by the shielding element.

By providing two fluid chambers that are fundamentally separate from one another, it is possible to lubricate different functional groups arranged in the roller interior space, such as unbalanced masses to be supported and a gear arrangement provided for transmitting a drive torque thereto, independently from one another. This allows the use of different lubricants or lubricant quantities according to the functional groups to be lubricated. The positioning of the discharge opening and level control opening provided in each group with respect to one another in such a way that, depending on the respective rotational positioning of the soil processing roller about the roller axis of rotation, they are either positioned in pairs in the circumferential direction in the region of the first release recess and are thus visually recognizable when viewed substantially in the direction of the roller axis of rotation through the first release recess, or these are also accessible for inserting or removing a respective end element, or are covered by the shielding element, so that a respective pair of discharge opening and level control opening cannot be seen when viewed substantially in the direction of the roller axis of rotation, or there is no access to them through the first release recess, further ensures that in each rotational positioning of the soil processing roller from the first rotational positioning and the second rotational positioning an operator can only interact with a pair of openings which is associated with one of the opening groups. This can contribute to an increased safety against emptying the wrong fluid chamber or improperly filling the wrong fluid chamber.

In order to be able to bring the different pairs of discharge opening and level control opening into alignment with the first release recess by rotating the soil processing roller about the roller axis of rotation, it is proposed that the first discharge opening and the first level control opening are provided in a housing portion of a first fluid chamber housing delimiting the first fluid chamber which rotates about the roller axis of rotation during soil processing operation, and in that the second discharge opening and the second level control opening are provided in a housing region of a second fluid chamber housing delimiting the second fluid chamber, which housing region rotates about the roller axis of rotation during soil processing operation.

The first filling opening can be positioned in the region of the first release recess independently of the rotational positioning of the soil processing roller, which can be achieved, for example, by the first filling opening being provided in a housing region of the first fluid chamber housing that does not rotate about the roller axis of rotation during soil processing operation, i.e. a housing region that is basically stationary.

For easy access, in particular also to the first filling opening, the first release recess can have a central release recess region, wherein the roller axis of rotation extends through the central release recess region and the first filling opening is positioned in the radial direction and in the circumferential direction in the region of the central release recess region.

For interaction with the discharge openings and level control openings of the two opening groups associated with each other in pairs, the release recess may have a release recess bulge region extending radially outwardly from the central release recess region, wherein the first discharge opening, the first level control opening, the second discharge opening and the second level control opening are positioned radially in the region of the release recess bulge region. This release recess bulge region is preferably dimensioned in such a way that it has such a limited extent in the circumferential direction that the pair of discharge opening and fill level control opening, which are aligned with the soil processing roller depending on the respective rotational positioning of the latter, are essentially completely visible when viewed in the axial direction through the release bulge recess region and there is also the possibility of acting on a respective end element, while the other circumferential regions in the same radial region are covered by the shielding element.

The central release recess region can, for example, be circular disc-shaped. In order to ensure complete discharging of the two fluid chambers with the discharge opening positioned in each case in the region of the release recess bulge region, it is further proposed that the release recess bulge region is positioned vertically substantially below the roller axis of rotation.

The shielding element may be, for example, a plate-like roller support element for fixing the soil processing roller to a machine frame of a soil processing machine.

For achieving a simple and stable structure, the housing portion of the first fluid chamber housing that does not rotate about the roller axis of rotation during soil processing operation may be fixed with respect to the shielding element.

At least one unbalanced mass rotatable about an unbalanced axis of rotation with a center of mass eccentric to the unbalanced axis of rotation can be arranged in the second fluid chamber. In order to be able to provide a driving interaction between such an unbalanced mass and an unbalanced drive motor, at least a portion of a gear arrangement for transmitting a drive torque from an unbalanced drive motor to the at least one unbalanced mass may be also arranged in the first fluid chamber.

The unbalanced drive motor may also be fixed with respect to the shielding element.

To further increase safety against incorrect operation, a second release recess can be provided in the shielding element, wherein in the second rotational positioning of the soil processing roller, the second filling opening is positioned in the circumferential direction in the region of the second release recess.

In order to be able to reliably fill the second fluid chamber with fluid through the second release recess, the latter can be positioned vertically substantially above the roller axis of rotation.

Also, the second filling opening may be provided in the housing portion of the second fluid chamber housing that rotates about the roller axis of rotation during soil processing operation.

In order to be able to reliably fulfill the function assigned to the discharge openings or level control openings, it is further proposed that the first discharge opening is arranged radially outside the first level control opening, or/and that the first discharge opening and the first level control opening lie essentially on a radial line intersecting the roller axis of rotation. It can be further provided for this purpose that the second discharge opening is arranged radially outside the second level control opening, or/and that the second discharge opening and the second level control opening lie substantially on a radial line intersecting the roller axis of rotation.

To also facilitate filling of fluid into the first fluid chamber, the first filling opening may be positioned vertically substantially above the roller axis of rotation. The second filling opening, the second discharge opening, and the second level control opening may be positioned substantially on a radial line intersecting the roller axis of rotation, such that when the second discharge opening and the second level control opening are positioned substantially vertically below the roller axis of rotation, the second filling opening is positioned substantially vertically above the roller axis of rotation.

For easy recognition of the correct positioning of the discharge opening and the level control opening of an opening group in the region of the first release recess, a positioning reference indicating the positioning of the discharge opening and the level control opening of this opening group in the region of the first release recess can be provided in association with at least one opening group on the soil processing roller. If the positioning reference is in a defined predetermined position, this is an indication that the opening group cooperating with it or their respective discharge opening and level control opening are positioned in the region of the first release recess.

The invention further relates to a soil processing machine comprising at least one soil processing roller having a structure according to the invention.

The present invention is described in detail below with reference to the accompanying figures. In particular:

Figure 1:
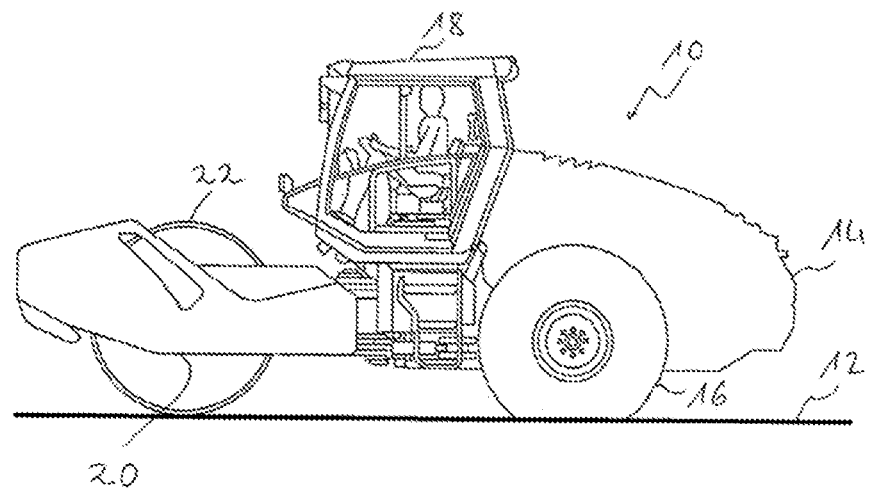
FIG. 1 shows a side view of a soil compactor formed with a soil processing roller configured as a compactor roller.

In FIG. 1, a soil processing machine 10 configured as a soil compactor is shown in side view on a soil 12 to be compacted. The soil processing machine 10 comprises a rear carriage 14, on which a drive unit and drive wheels 16 are provided, wherein the drive wheels are driven by the drive unit for moving the soil processing machine 10 on the soil 12. Furthermore, an operator's cabin 18 for an operator operating the soil processing machine 10 is provided on the rear carriage 14.

A front carriage 20 is pivotally connected to the rear carriage 14 in the region of an articulated joint 22, so that the soil processing machine 10 can be steered by pivoting the front carriage 20 with respect to the rear carriage 14 about an approximately vertically oriented steering axis. On the front carriage 20, a soil processing roller 22 designed as a compactor roller in the illustrated exemplary embodiment is supported in such a way that it can be rotated about a roller axis of rotation orthogonal to the drawing plane of FIG. 1. In principle, the soil processing roller 22 can be supported on the front carriage 20 so as to be freely rotatable, but it can also be driven to rotate about the roller axis of rotation for moving the soil compactor 10 on the ground 12.

Hereinafter, with reference to FIGS. 2 to 4, an exemplary embodiment of such a soil processing roller 22 will be explained. It should be noted that the soil compactor 10 could also have such a soil processing roller on the rear carriage 14, or could in principle have two soil processing rollers, at least one of which has the design described below with reference to FIGS. 2 to 4.

Figure 2:
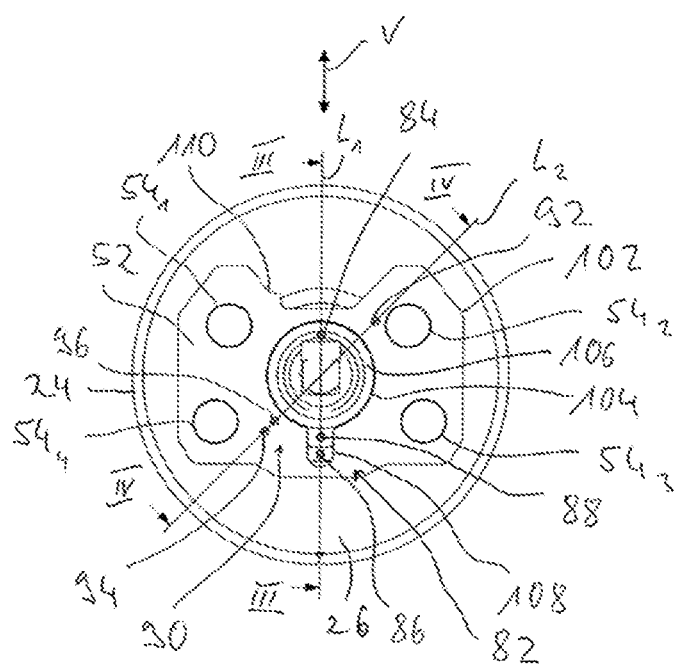
FIG. 2 shows an axial view of a soil processing roller which can be used with the soil compactor of FIG. 1 as viewed in the direction A in FIG. 3.
Figure 3:
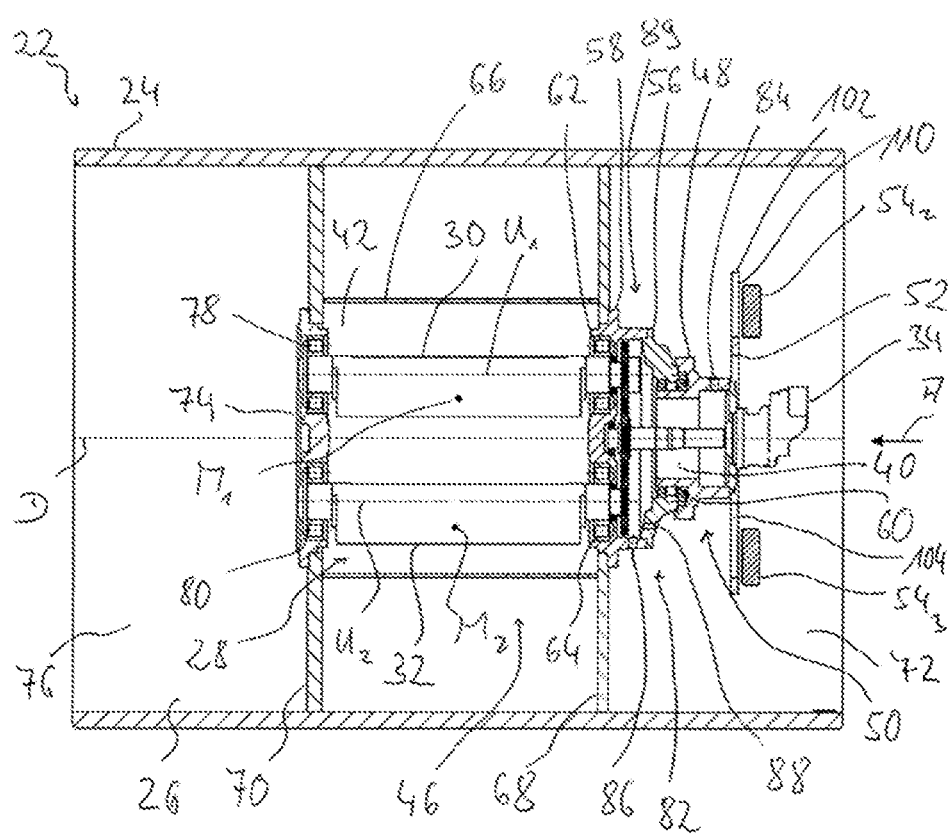
FIG. 3 shows a longitudinal sectional view of the soil processing roller of FIG. 2, cut along a line III-Ill in FIG. 2.
Figure 4:
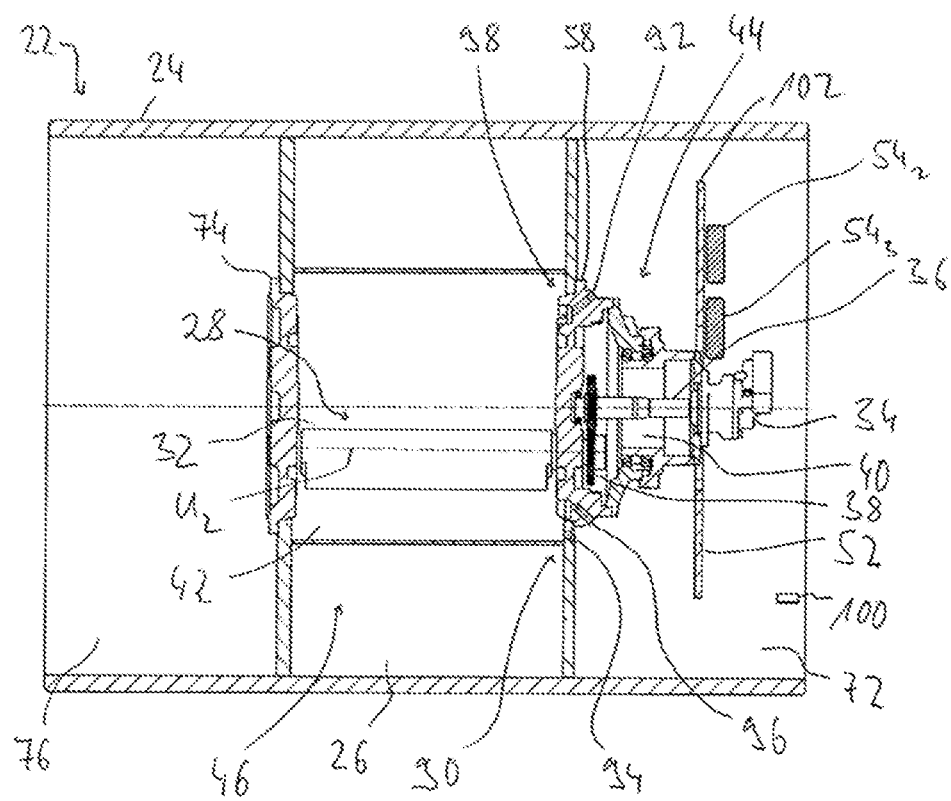
FIG. 4 shows a longitudinal sectional view of the soil processing roller of FIG. 2, cut along a line IV-IV in FIG. 2.

The soil processing roller 22 shown in FIGS. 2 to 4 comprises a roller shell 24 elongated in the direction of the roller axis of rotation D and surrounding the same. An unbalanced arrangement generally designated as 28 is provided in the interior space 26 of the roller surrounded by the roller shell 24. In the illustrated example, this comprises two unbalanced masses 30, 32 rotatable about respective unbalanced axes of rotation $U_1$, $U_2$, each with a center of mass $M_1$, $M_2$ eccentric to the respective unbalanced axis of rotation $U_1$ or $U_2$. By rotating the unbalanced masses 30, 32 about the respective unbalanced axes of rotation $U_1$, $U_2$ associated thereto and by suitably adjusting the phase position of the unbalanced masses 30, 32 or of the centers of mass $M_1$, $M_2$, a periodic action on the soil processing roller 22 or on the soil 12 to be processed, in particular to be compacted, by the latter can be achieved during soil processing operation. Depending on the phase position of the centers of mass $M_1$, $M_2$, this influence can be provided by a force oriented substantially orthogonally to the roller axis of rotation D, so that the unbalanced arrangement 28 or the soil processing roller 22 operates in a vibration mode. In an oscillation mode of the unbalanced arrangement 28, the rotating unbalanced masses 30, 32 generate a torque periodically accelerating the soil processing roller 22 or the roller shell 24 back and forth in the circumferential direction.

In order to drive the two unbalanced masses 30, 32 to rotate, an unbalanced drive motor 34 designed, for example, as a hydraulic motor is provided. This drives the unbalanced masses 30, 32 to rotate via an output shaft 36 and a gear arrangement 38 comprising gear trains in the illustrated exemplary embodiment. It should be noted that the gear arrangement 38 could also comprise a belt drive or chain drive instead of the gear trains, in which each of the unbalanced masses 30, 32 is coupled to the output shaft 36 of the unbalanced drive motor 34 via a belt, for example a toothed belt, or a chain for joint rotation.

In association with the gear arrangement 38, on the one hand, and the unbalanced arrangement 28, on the other hand, a first fluid chamber 40 and a second fluid chamber 42 are formed during soil processing roller 22, i.e. in the roller interior space 26. In this regard, the first fluid chamber 40 is provided in a first fluid chamber housing 44 generally designated 44, while the second fluid chamber 42 is formed in a second fluid chamber housing generally designated 46.

The first fluid chamber housing 44 includes a housing portion 48 that substantially provides a non-rotating housing portion 50 of the first fluid chamber housing 44. The housing portion 48 is, for example, directly fixed to a plate-like support element 52, which is substantially fixedly supported on a machine frame, in the illustrated example the front carriage 20 of the soil compactor 10, via, for example, four resilient suspension elements 541, 542, 543, 544, which are made of rubber material, for example. Also, for example, the unbalanced drive motor 34 may be directly fixed to the plate-like support element 52 and thus supported via the latter on the front carriage 20 in a substantially fixed manner, i.e. non-rotatably about the roller axis of rotation D.

The first fluid chamber housing 44 further comprises housing portions 56, 58 which are fixedly connected to each other or may also be formed integrally, i.e. monolithically, and are rotatably supported on the housing portion 48 via a substantially fluid-tight bearing arrangement 60 about the roller axis of rotation D.

The housing portions 48, 56, 58, in conjunction with the support element 52, for example, substantially completely encapsulate the first fluid chamber 40, wherein the unbalanced masses 30, 32 are rotatably mounted on the housing portion 58 in one of their axial end regions via bearings 62, 64. The bearings 62, 64 supported on the housing portion 58 also substantially provide fluid separation between the first fluid chamber 40 and the second fluid chamber 42.

The housing portion 58 supporting the bearings 62, 64 also forms a component of the second fluid chamber housing 46. This second fluid chamber housing 46 further comprises a circumferential wall 66 surrounding the roller axis of rotation D, for example substantially cylindrically, which wall is supported in its two axial end regions on support disks 68, 70 also supporting the roller shell 24. The housing portion 58 is supported on the support disk 68 and thus delimits the second fluid chamber 42 towards a first axial end region 72 of the roller interior space 26. A housing portion 74 fixed to the support disk delimits together with the support disk 70 the second fluid chamber 42 in the direction towards a second axial end region 76 of the roller inner chamber 26 or of the soil processing roller 22. The two unbalanced masses 30, 32 are rotatably mounted on the housing portion 74 in their other axial end regions via respective bearings 78, 80.

A first opening group 82 is provided for filling and emptying the first fluid chamber 44. The first opening group 82 comprises a first filling opening 84 in the housing portion 48, i.e. the non-rotating housing portion 50 of the first fluid chamber housing 44, and further comprises a first discharge opening 86 and a first level control opening 88, wherein in the illustrated exemplary embodiment the first discharge opening 86 is formed in the housing portion 58 and the first level control opening 88 is formed in the housing portion 56. This means that the first discharge opening 86 and the first level control opening 88 are arranged in a housing portion 89 of the first fluid chamber housing 44 rotating about the roller axis of rotation D during soil processing operation.

In FIGS. 2 and 3, it can be seen that the first filling opening 84 is arranged on the non-rotating housing region 50 of the first fluid chamber housing 44 in a vertical direction V substantially directly above the roller axis of rotation D. The first discharge opening 86 and the first fill level control opening 88 lie on a radial line $L_1$ intersecting the roller axis of rotation D and thus orthogonal thereto, the first discharge opening 86 having a greater radial distance from the roller axis of rotation D than the first fill level control opening 88. When the soil processing roller 22 is positioned in a first rotational position of the soil processing roller 22 about the roller axis of rotation D, as illustrated in FIGS. 2 and 3, the first filling opening 84 also lies on this radial line $L_1$ and the first discharge opening 86 and the first fill level control opening 88 lie vertically substantially directly underneath the roller axis of rotation D.

In association with the second fluid chamber 42, a second opening group 90, which can be seen in FIG. 4, is provided at the same axial end region of the roller interior space 26 as the first opening group 82, i.e. at the first axial end region 72. The second opening group 90 comprises, on the housing portion 58, a second filling opening 92, a second discharge opening 94, and a second level control opening 96. Since the entire second fluid chamber housing 46 rotates about the roller axis of rotation D during soil processing operation, the second filling opening 92, second discharge opening 94, and second level control opening 96 provided in the housing portion 58 are arranged in a housing region 98 of the second fluid chamber housing 46 rotating about the roller axis of rotation D during soil processing operation.

As can be seen in FIGS. 2 and 4, the second filling opening 92, the second discharge opening 94 and the second fill level control opening 96 lie on a radial line $L_2$ which intersects the roller axis of rotation D and is therefore orthogonal thereto, wherein the second filling opening 92, on the one hand, and the second discharge opening 94 and the second fill level control opening 96, on the other hand, lie on diametrically opposite sides with respect to the roller axis of rotation D.

In a second rotational position of the soil processing roller 22 shown in FIG. 4, the radial line $L_2$ is oriented along the vertical direction V, so that the second filling opening 92 lies vertically substantially directly above the roller axis of rotation D and the second discharge opening 94 and the second fill level control opening 96 lie vertically substantially directly below the roller axis of rotation D. Also in this second opening group 90, the radial distance of the second discharge opening 94 from the roller axis of rotation D is greater than the radial distance of the second level control opening 96 from the roller axis of rotation D, in particular in the region in which the latter opens to the second fluid chamber 42.

It should be noted that a respective closing element in the form of a screw plug, for example, which closes the associated opening in a fluid-tight manner, in particular during soil processing operation, but which can be removed for emptying or for refilling with fluid, is provided in association with each filling opening 84, 92, each discharge opening 86, 94 and each fill level control opening 88, 96. For discharging fluid, the closing element associated with a respective discharge opening 86, 96 is removed in order to discharge fluid from the respective fluid chamber 40 or 42. When refilling fluid into the fluid chambers 42, with the discharge opening 86, 94 closed and the filling opening 84, 92 and the level control opening 88, 96 open, a fluid, for example oil, is introduced into the respective fluid chamber 40 or 42 via the filling opening 84, 92 until fluid emerges from the respective level control opening 88, 96. When this takes place, the respective filling opening 84, 92 and level control opening 88, 96 are also sealed fluid-tight again by the associated closing element.

In order to hereby ensure the complete emptying of the fluid chambers 40, 42 or to achieve the setting in of a suitable fill level of the fluid in the respective fluid chamber 40, 42, the first fluid chamber 40 is filled or emptied in the first rotational positioning of the soil processing roller 22 illustrated in FIGS. 2 and 3. As already explained, in the first rotational positioning of the soil processing roller 22, the first discharge opening 86 and the first level control opening 88 are vertically located substantially directly below the roller axis of rotation D or also one above the other. For filling or emptying the second fluid chamber 42, the soil processing roller 22 is arranged in the second rotational positioning illustrated in FIG. 4, in which the second filling opening 92 is vertically located substantially directly above the roller axis of rotation D and the second discharge opening 94 and the second level control opening 96 are vertically located substantially directly below the roller axis of rotation D and one above the other.

In order to allow a simple identification of a respective rotational positioning, a positioning reference 100 may be provided in association with each of the opening groups 82, 90. In the illustrated exemplary embodiment, the positioning reference 100 is associated with the first opening group 82 and is provided, for example, in the first axial end region 72 of the roller interior space 26 on the inner side of the roller shell 24 in such a way that in the case of the first rotational positioning and thus when the first discharge opening 86 and the first level control opening 88 are located substantially vertically below the roller axis of rotation, the position of the reference 100 is directly opposite the soil 12 and thus also vertically substantially directly below the roller axis of rotation D. Similarly, the second opening group 90 may also have such a positioning reference offset from the positioning reference 100 of the first opening group 82 in the circumferential direction.

In the soil processing roller 22 illustrated in FIGS. 2 to 4, the plate-like support element 52 forms a shielding element generally designated by 102. By means of the shielding element 102, in the first axial end region 72 of the roller interior space 26, the two opening groups 82, 90 are basically shielded against visual observation, when the soil processing roller 82 is viewed in an axial direction A shown in FIG. 3, and are also substantially inaccessible.

A first release recess, generally designated as 104, is provided in the support element 52 or shielding element 102. The first release recess 104 comprises a circular disk-shaped central release recess region 106 substantially concentric with the roller axis of rotation D, for example, and a release recess bulge region 108 extending radially away from the central release recess region 106 in a lower position, with respect to the vertical direction V. In particular, in FIG. 2, it can be seen that the first filling opening 84 is positioned on the housing portion 48 such that it is radially within the central release recess region 106, so that the first filling opening 84 can be visually observed when viewed in the axial direction A and the end element associated therewith can be manipulated, i.e., removed and reattached, through the central release recess region 106.

The release recess bulge region is positioned and dimensioned such that, when the soil processing roller is positioned in the first rotational positioning, the first discharge opening 86 and the first level control opening 88 are located in the circumferential direction in the region of the release recess bulge region 108, wherein the latter extends radially downwards to such an extent that the first discharge opening 86 and the first level control opening 88 are not covered by the shielding element 102 even in the radial direction. Therefore, in the first rotational positioning of the soil processing roller 22, the first discharge opening 86 and the first fill level control opening 88 can also be visually monitored through the first release recess 104 and the end elements associated therewith can be manipulated, i.e. removed and reattached, through the first release recess 104, in particular the release recess bulge region 108 thereof.

FIG. 2 shows that, in the first rotational positioning of the soil processing roller 22, all the openings of the second opening group 90 are covered by the shielding element 102. This means that the second discharge opening 94 and the second fill level control opening 96 are not circumferentially located in the region of the first release recess 104, in particular the release recess bulge region 108 thereof, but this occurs when the soil processing roller is in the second rotational positioning, in which the radial line $L_2$ is oriented substantially vertically.

The second filling opening 92 is also covered by the shielding element 102 in the axial direction when the soil processing roller 22 is in the first rotational positioning, which is primarily also due to the fact that the second filling opening 92 has a greater radial distance from the roller axis of rotation D than the first filling opening 84. In other words, the second filling opening 92 cannot be visually perceived when viewed in the axial direction even through the central release recess 106.

A vertically upwardly open second release recess 110 is formed in an upper portion of the shielding element 102 in the vertical direction V. This is positioned and dimensioned in such a way that in the second rotational positioning of the soil processing roller 22, i.e. with the radial line $L_2$ oriented substantially vertically, the second filling opening 92 is positioned in the circumferential direction and also in the radial direction in the region of this second release recess 110, while at the same time the second discharge opening 94 and the second fill level control opening 96 are positioned in the region of the first release recess 104, in particular in the region of the release recess bulge region 108 thereof. Thus, in the second rotational positioning of the soil processing roller 22, all the openings of the second opening group 90 can be visually observed and there is also the possibility of acting on the closing elements associated therewith, while in particular the first discharge opening 86 and the second discharge opening 88 are covered by the shielding element 102, with the radial line $L_1$ then being no longer oriented vertically.

It should be noted that, for example, between the plate-like support element 52, i.e. the shielding element 102, and the first fluid chamber housing 44 or the second fluid chamber housing 46, further components of the soil processing roller 22 or the soil compactor 10 may be positioned, which may prevent or impair a direct visual observation of the second filling opening 92 in the second rotational positioning of the soil processing roller 22 through the second release recess 110, so that it may be necessary to view the second filling opening 92, for example, from obliquely above through the shielding element 102. In this case, the provision of the second release recess 110 could be dispensed with, or the second release recess could be dimensioned such that, when viewed from obliquely above, the second filling opening 92 can be viewed or manipulated through such a second release bulge recess 110 which is then of slightly shorter radial extension.

The invention claimed is:

1. A soil processing roller comprising:
a roller shell elongated in the direction of a roller axis of rotation and rotating about the roller axis of rotation during a soil processing operation,
a first fluid chamber in a roller interior space delimited by the roller shell, wherein, in association with the first fluid chamber in an axial end region of the roller interior space, a first opening group comprising a first filling opening, a first discharge opening and a first fill level control opening is provided,
a shielding element disposed in the axial end portion of the roller interior space and not rotating about the roller axis of rotation during a soil processing operation, wherein a first release recess is provided in the shielding element,
wherein a second fluid chamber, substantially separated from the first fluid chamber against fluid exchange, in the roller interior space delimited by the roller shell, wherein, in association with the second fluid chamber in the axial end region of the roller interior space, a second opening group comprising a second filling opening, a second discharge opening and a second fill level control opening is provided,
and in that:
in a first rotational positioning of the soil processing roller about the roller axis of rotation, the first discharge opening and the first fill level control opening are positioned in the circumferential direction in the region of the first release recess, and the second discharge opening and the second fill level control opening are covered by the shielding element,
in a second rotational positioning of the soil processing roller about the roller axis of rotation, the second discharge opening and the second fill level control opening are positioned in the circumferential direction in the region of the first release recess and the first discharge opening and the first fill level control opening are covered by the shielding element.

2. The soil processing roller according to claim 1, wherein the first discharge opening and the first level control opening are provided in a housing region of a first fluid chamber housing delimiting the first fluid chamber, said housing region rotating about the roller axis of rotation during soil processing operation, and in that the second discharge opening and the second level control opening are provided in a housing region of a second fluid chamber housing delimiting the second fluid chamber, said housing region rotating about the roller axis of rotation during soil processing operation.

3. The soil processing roller according to claim 1, wherein the first filling opening is positioned in the region of the first release recess independently of the rotational positioning of the soil processing roller.

4. The soil processing roller according to claim 3, wherein the first filling opening is provided in a housing region of the first fluid chamber housing that does not rotate about the roller axis of rotation during soil processing operation.

5. The soil processing roller according to claim 4, wherein the housing portion of the first fluid chamber housing, which does not rotate about the axis of rotation of the roller during soil processing operation, is fixed with respect to the shielding element.

6. The soil processing roller according to claim 3, wherein the first release recess comprises a central release recess region, wherein the roller axis of rotation extends through the central release recess region and the first filling opening is positioned in radial direction and in circumferential direction in the region of the central release recess region, and in that the release recess has a release recess bulge region extending radially outwardly from the central release recess region, wherein the first discharge opening, the first fill level control opening, the second discharge opening and the second fill level control opening are positioned radially in the region of the release recess bulge region.

7. The soil processing roller according to claim 6,
wherein the central release recess region is shaped as a circular disk, or/and in that the release recess region is positioned vertically substantially below the roller axis of rotation.

8. The soil processing roller according to claim 1,
wherein the shielding element is a plate-like roller support element for fixing the soil processing roller to a machine frame of a soil processing machine.

9. The soil processing roller according to claim 8,
wherein the unbalanced drive motor is fixed with respect to the shielding element.

10. The soil processing roller according to claim 1,
wherein at least one unbalanced mass rotatable about an unbalanced axis of rotation is arranged in the second fluid chamber with a center of mass eccentric to the unbalanced axis of rotation, and in that at least a portion of a gear arrangement for transmitting a drive torque from an unbalanced drive motor to the at least one unbalanced mass is arranged in the first fluid chamber.

11. The soil processing roller according to claim 1,
wherein a second release recess is provided in the shielding element, wherein, in the second rotational positioning of the soil processing roller, the second filling opening is positioned in the circumferential direction in the region of the second release recess.

12. The soil processing roller according to claim 11,
wherein the second release recess is positioned vertically substantially above the roller axis of rotation.

13. The soil processing roller according to claim 11,
wherein the second filling opening is provided in the housing portion of the second fluid chamber housing rotating about the roller axis of rotation during soil processing operation.

14. The soil processing roller according to claim 1,
wherein the first discharge opening is arranged radially outside the first level control opening, or/and in that the first discharge opening and the first level control opening lie substantially on a radial line intersecting the roller axis of rotation.

15. The soil processing roller according to claim 1,
wherein the second discharge opening is arranged radially outside the second fill level control opening, or/and in that the second discharge opening and the second fill level control opening lie substantially on a radial line intersecting the roller axis of rotation.

16. The soil processing roller according to claim 1,
wherein the first filling opening is positioned vertically substantially above the roller axis of rotation, or/and in that the second filling opening, the second discharge opening and the second fill level control opening lie substantially on a radial line intersecting the roller axis of rotation.

17. The soil processing roller according to claim 1,
wherein, in association with at least one opening group on the soil processing roller, a positioning reference indicating the positioning of the discharge opening and the level control opening of this opening group in the region of the first release recess is provided.

18. A soil processing machine comprising at least one soil processing roller according to claim 1.

* * * * *